United States Patent [19]
Bunzli

[11] 3,927,919
[45] Dec. 23, 1975

[54] SUPPORT AND GUIDE CAGE
[75] Inventor: Paul Bunzli, Bevaix, Switzerland
[73] Assignee: Hydrel A.G., Romanshorn, Switzerland
[22] Filed: Aug. 22, 1974
[21] Appl. No.: 499,846

[30] Foreign Application Priority Data
Aug. 25, 1973 Switzerland.................. 12348/73

[52] U.S. Cl................................ 308/6 R; 308/3 A
[51] Int. Cl.²......................................... F16C 29/04
[58] Field of Search........ 104/134, 135, 137, 172 R, 104/172 B, 172 BT, 172 C; 193/35 R, 35 F, 35 J, 37; 308/20, 207 R, 217, 3 A, 6 R, 184 R, 207 A

[56] References Cited
UNITED STATES PATENTS
3,778,121  12/1973  Levesque.................. 308/3 A X
3,815,293  6/1974   Karbowski................. 308/3 A X FOREIGN PATENTS OR APPLICATIONS
1,168,176  4/1964  Germany.................... 308/6 R Primary Examiner—Robert J. Spar
Assistant Examiner—Randolph A. Reese
Attorney, Agent, or Firm—Waters, Schwartz & Nissen

[57] ABSTRACT

A support and guide cage for longitudinal guideways having roller bodies. The guide cage length can be provided and, at will, the guideway may be constructed with regard to its roller bodies, in either a damped manner, or with a play or tolerance. Each guide cage component which supports a roller body is serially threaded onto at least one wire length or lengthwise profiled rod extending the longitudinal guideways or conveying direction, in any required number.

7 Claims, 6 Drawing Figures

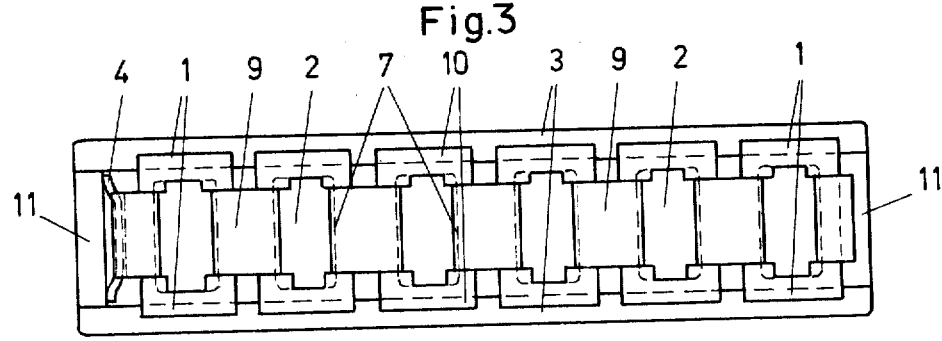
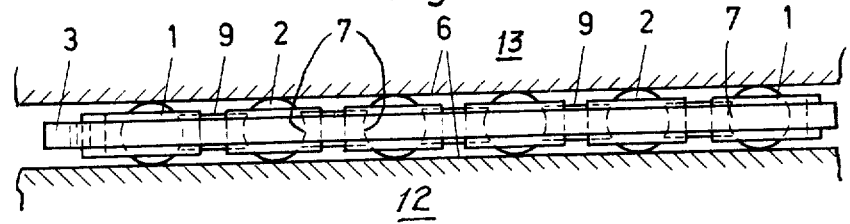

SUPPORT AND GUIDE CAGE

FIELD OF THE INVENTION

The present invention relates to a support and guide cage for longitudinal guide ways having roller bodies.

Guide and support cages for longitudinal guideways with roller bodies are employed as machine elements, in order to guide the roller bodies along a conveyor path, support them as mountings and, depending upon circumstances, provide damping. These guide cages are generally constructed of metal or plastic material in predetermined necessary lengths in accordance with a particular purpose. For undamped guideways these cages are manufactured at a predetermined play or tolerance with respect to the roller bodies whereas, for damped guideways, the roller bodies are braced in the longitudinal direction in order to achieve friction damping.

DISCUSSION OF THE PRIOR ART

The presently known prior art constructions have the disadvantage in that the guide cages cannot be employed for the bracing of the roller bodies and, concurrently, cannot be assembled for each particular guideway or conveyance length.

SUMMARY OF THE INVENTION

The invention eliminates the foregoing disadvantage encountered in the prior art in that every guide cage length can be provided and, at will, the guideway may be constructed with regard to its roller bodies, in either a damped manner, or with a play or tolerance.

In particular, the present roller body guide cage is adapted for use in a machine slide of the type disclosed, for example, in U.S. Pat. No. 3,778,121.

The foregoing is inventively achieved in that each guide cage component which supports a roller body is serially threaded onto at least one wire length or lengthwise profiled rod extending the longitudinal guideways or conveying direction, in any required number.

BRIEF DESCRIPTION OF THE DRAWINGS

In the following detailed description, three exemplary embodiments of the invention described in conjunction with the accompanying drawings; in which:

FIG. 3 illustrates a plan view of a guide cage incorporating a lengthwise profiled rod and friction damping; and FIG. 4 shows a side view thereof.

DETAILED DESCRIPTION

Figure 1:
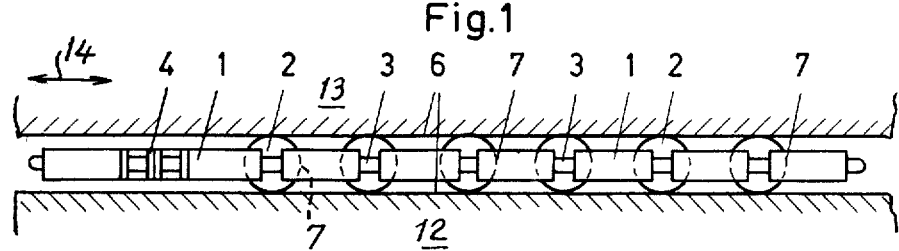
FIG. 1 in a side elevational view illustrates the guide cage of the invention in conjunction with a wire length.
Figure 2:
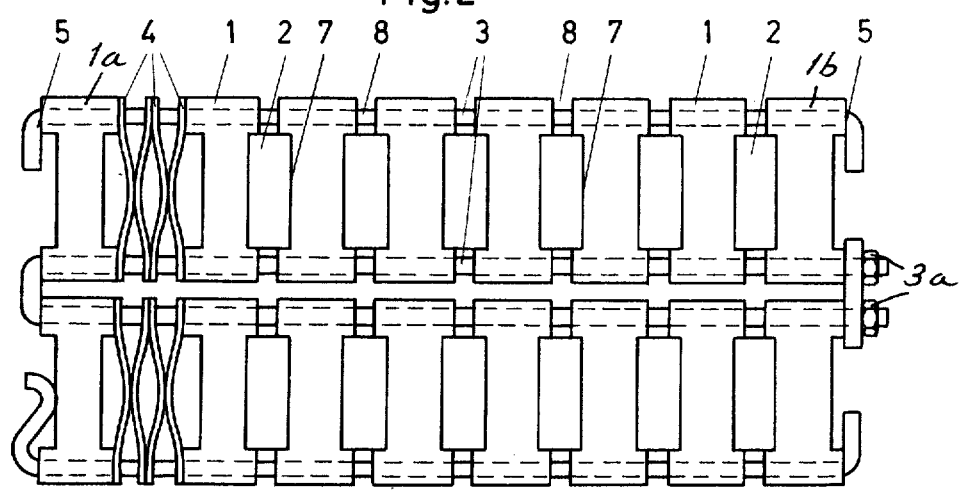
FIG. 2 shows a plan view.

Referring now in detail to the drawings, and particularly the embodiment of FIGS. 1, 2, 2a and 2b, the support or guide cage consists of guide cage portions 1 which secure the roller bodies 2 against falling out, and in their positions relative to the conveyance path 6, and which provide damping through friction at their curved contact surfaces 7 which engage a portion of the circumferential surface of the roller bodies 2. The guide cage portions 1 are threaded onto a longitudinal wire 3, suitably through the provision of corresponding bores, and forming intermediate spaces or gaps 8 and are longitudinally braced by means of springs 4 across the roller bodies 2. When the required bracing is attained due to assembly, then the wire ends at the last guide cage portion 1 are bent at point 5. This will maintain the bracing or tensioning of the entire support or guide cage. Any subsequent change in the bracing may be effected through adjustment of adjusting nut 32. The conveyance path 6 of FIGS. 1 and 2 is formed by a machine slide of the type shown in U.S. Pat. No. 3,778,121 in which 12 represents a machine bed, and 13 a carriage longitudinally displaceable relative thereto on roller bodies 2, in the direction of arrow 14.

Figure 2A:
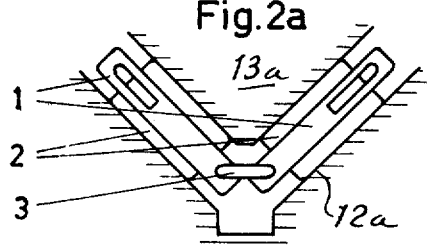
FIG. 2a illustrates a cross-section through FIG. 2 with the guideway being a V-shaped configuration.
Figure 2B:
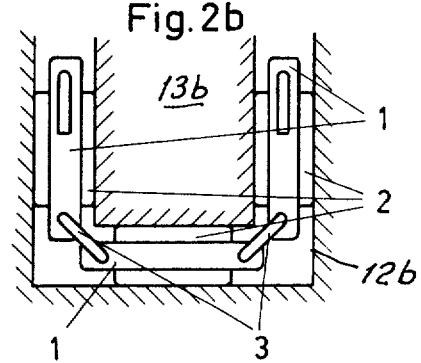
FIG. 2b illustrates a cross-section through FIG. 2 with the guideway being in a U-shaped configuration.

In the embodiments of FIGS. 2a and 2b these machine elements are identified by, respectively, reference numerals 12a and 13a, and 12b and 13b.

Referring now to the embodiment of FIGS. 3 and 4 of the drawings, the support or guide cage shown therein additionally includes intermediate elements 9 which are positioned between adjacent of the roller bodies 2, as well as spring 4 which braces the roller bodies 2 across the intermediate elements 9. Friction damping is thus formed at the curved contact surfaces 7 of the intermediate elements 9 and the circumferential portions of the roller bodies 2. The support or guide cage components 1 are mounted on the rods 3 with the provision of intermediate spaces or gaps.

While there has been shown what is considered to be the preferred embodiment of the invention, it will be obvious that modifications may be made which come within the scope of the disclosure of the specification.

What is claimed is:

1. In a roller body guide cage for a roller bearing of a longitudinally displaceable carriage, such as a machine tool carriage, including a plurality of uniformly-shaped guide cage elements for retaining roller bodies therebetween; at least two parallel elongate elements, said guide cage elements being serially mounted on said elongate elements, the improvement comprising: said guide cage elements being supported in said elongate elements for longitudinal movement therealong; and at least one prestressed element being located at least at one end of said guide cage for exerting a force against said guide cage elements and roller bodies in the longitudinal direction of said cage.

2. A guide cage as claimed in claim 1, said prestressed element comprising at least one spring.

3. A guide cage as claimed in claim 2, comprising a threaded portion being formed on at least one of said elongate elements; and a nut being threaded on said threaded portion acting against said cage elements for varying the prestressing force of said spring through varying the effective length of said elongate element.

4. A guide cage as claimed in claim 1, at least one of said elongate elements for sequentially mounting the guide cage elements forming a linkage axis for a plurality of guide cage components positioned in a substantially V-shaped guideway configuration.

5. A guide cage as claimed in claim 1, at least one of said elongate elements for sequentially mounting the guide cage elements forming a linkage axis for a plurality of guide cage components positioned in a substantially U-shaped guideway configuration.

6. A guide cage as claimed in claim 1, said elongate elements being each formed of a length of wire.

7. A guide cage as claimed in claim 1, said elongate elements being each formed of a sectionally-profiled longitudinal rod.

* * * * *